(12) United States Patent
Beck et al.

(10) Patent No.: US 11,641,094 B1
(45) Date of Patent: May 2, 2023

(54) WIRE PULLER

(71) Applicant: SOUTHWIRE COMPANY, LLC, Carrollton, GA (US)

(72) Inventors: Michael Beck, Newnan, GA (US); Allan Daniel, Woodland, AL (US); Timmothy Bardin, Newnan, GA (US); Randall McNurlin, Phoenix, AZ (US)

(73) Assignee: SOUTHWIRE COMPANY, LLC, Carrollton, GA (US)

( * ) Notice: Subject to any disclaimer, the term of this patent is extended or adjusted under 35 U.S.C. 154(b) by 0 days.

(21) Appl. No.: 17/586,345

(22) Filed: Jan. 27, 2022

Related U.S. Application Data (63) Continuation of application No. 16/583,939, filed on Sep. 26, 2019, now Pat. No. 11,271,376.

(60) Provisional application No. 62/737,639, filed on Sep. 27, 2018.

(51) Int. Cl.
*H02G 1/08* (2006.01)
*B66D 1/74* (2006.01)

(52) U.S. Cl.
CPC ........... *H02G 1/081* (2013.01); *B66D 1/7489* (2013.01)

(58) Field of Classification Search
CPC .. H02G 1/00; H02G 1/06; H02G 1/08; H02G 3/00
See application file for complete search history.

(56) References Cited

U.S. PATENT DOCUMENTS

| | | | |
|---|---|---|---|
| 2,286,781 A | 6/1942 | Abramson et al. | |
| 3,190,616 A | 6/1965 | Oleson | |
| 3,223,384 A | 12/1965 | Gebo | |
| 4,456,225 A | 6/1984 | Lucas | |
| 4,971,293 A | 11/1990 | Roberson, Jr. | |
| 5,984,273 A | 11/1999 | Ray | |
| 6,431,524 B1 | 8/2002 | Weber | |
| 6,682,050 B1 | 1/2004 | Ray | |
| 7,111,826 B2 | 9/2006 | Cook et al. | |
| 7,309,060 B2 | 12/2007 | Baughman et al. | |
| 8,016,267 B2 | 9/2011 | Jordan et al. | |
| 8,246,009 B2 | 8/2012 | Plummer | |
| 8,302,936 B2 | 11/2012 | Plummer | |
| 8,308,138 B1 | 11/2012 | Jordan et al. | |
| 8,434,741 B2 | 5/2013 | Radle et al. | |
| 9,172,224 B2 | 10/2015 | Jordan et al. | |
| 10,294,067 B1 | 5/2019 | DeBellis | |
| 2005/0062003 A1 | 3/2005 | Wentworth et al. | |
| 2009/0078921 A1 | 3/2009 | Plummer | |

(Continued)

OTHER PUBLICATIONS

Greenlee Instruction Manual, "Ultra Tugger™ Cable Puller and Pulling Packages 6800-22, 6802-22, 6805-22," Greenlee Textron/Subsidiary of Textron Inc., 2001, 54 pages.

(Continued)

*Primary Examiner* — Lee D Wilson
(74) *Attorney, Agent, or Firm* — Merchant & Gould P.C.

(57) ABSTRACT

A wire puller may be provided. The wire puller may comprise a middle portion, a restraint frame, and a front portion. The middle portion may comprise a gear box, a front bracket, a back bracket, and a capstan. The gear box may comprise a drive shaft and the capstan may comprise a hook pin. The restraint frame may be attached to the back bracket. The front portion may be attached to the front bracket. The front portion may comprise a pivot frame, a tube, an arm, a first side plate, a second side plate, a roller, and a flip out support. The pivot frame may comprise a locking mechanism.

20 Claims, 7 Drawing Sheets

(56) References Cited

U.S. PATENT DOCUMENTS

| | | |
|---|---|---|
| 2010/0065798 A1 | 3/2010 | Spells, Jr. |
| 2013/0240807 A1 | 9/2013 | Radle et al. |
| 2014/0131645 A1 | 5/2014 | Jordan et al. |
| 2018/0191141 A1 | 7/2018 | Schmidt et al. |

OTHER PUBLICATIONS

Southwire™ Tools & Equipment Operating and Maintenance Instructions, "Maxis® 3K Puller (M3K-M)," Southwire Company, LLC, 2016, 10 pages.

WIRE PULLER

PRIORITY CLAIM AND CROSS-REFERENCE

This application is a continuation of U.S. patent application Ser. No. 16/583,939, titled "Wire Puller" filed Sep. 26, 2019, which claims priority to U.S. Provisional Application No. 62/737,639, titled "Wire Puller" filed on Sep. 27, 2018, the entire disclosures of which are hereby incorporated herein by reference.

BACKGROUND

Supplying buildings with electricity and communications involves threading lines, or cable, through conduit. The path that a wire must travel through in the conduit includes changes in elevation and turns around corners. The procedure used to run the wire involves first threading lightweight flexible lines or rope through the entire length of a conduit. Heavier lines are then pulled through by attaching them to one end of the lighter line and pulling the lighter line through at the other end of the conduit. This procedure may need to be repeated until a line is threaded that can bear the weight of the target wire that is then attached and pulled through the conduit.

To thread heavier lines, lighter lines must be pulled through first. The pulling force required can be significant depending on the weight of the heavier lines and distance traveled. The pulling force can also increase with the bends and turns in the conduit. Thus, there is a need to substitute machine force for human force to reduce the human effort required in this procedure.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

A wire puller may be provided. The wire puller may comprise a middle portion, a restraint frame, and a front portion. The middle portion may comprise a gear box, a front bracket, a back bracket, and a capstan. The gear box may comprise a drive shaft and the capstan may comprise a hook pin. The restraint frame may be attached to the back bracket. The front portion may be attached to the front bracket. The front portion may comprise a pivot frame, a tube, an arm, a first side plate, a second side plate, a roller, and a flip out support. The pivot frame may comprise a locking mechanism.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Embodiments of the disclosure may include a wire puller. A front portion of the wire puller may be rested, for example, in a junction box opening. Then an electric drill may be positioned such that one end of a drive shaft of the wire puller fits into jaws of the electric drill's chuck such that, when a power button of the electric drill is depressed, a rotating of the electric drill causes a capstan of the wire puller to rotate. The electric drill's chuck may be tightened over the drive shaft of the wire puller. This may allow the electric drill to be easily attached and detached to and from the wire puller.

Operating the wire puller with the attached electric drill may only require a single operator. Furthermore, operation of the wire puller may not require the wire puller operator to hold the electric drill. This is because the attached electric drill may be tightly coupled to the drive shaft of the wire puller and supported by a restraint frame of the wire puller.

To operate the wire puller, the wire puller's operator may actuate the electric drill. When the electric drill is actuated, the drive shaft may rotate and correspondingly cause the capstan to rotate. To pull a line, the operator may attach the line to be pulled to a hook pin of the capstan and wrap the line around the capstan. This wrapping may create a frictional coupling of the capstan to the line that may allow the rotating capstan to pull the line. As long as the wire puller's operator keeps the line taut against the rotating capstan and attached to the hook pin, the wire puller may pull the line. To stop pulling the line, the wire puller's operator may release the electric drill's power button.

Thus, the disclosed wire puller may be easily transported, assembled, and operated. Only a single operator may need to operate the wire puller. The wire puller operator need not hold the electric drill nor control the line pulling from the power button on the electric drill. And while the wire puller is not operational, the electric drill may be detached from the wire puller to serve other purposes.

FIG. 1A, FIG. 1B, FIG. 1C, and FIG. 1D show a wire puller 100 consistent with embodiments of the disclosure. As shown in FIG. 1A, FIG. 1B, FIG. 1C, and FIG. 1D, wire puller 100 may comprise a middle portion 102, a restraint frame 104, and a front portion 106. Middle portion 102 may comprise a gear box 108, a front bracket 110, a back bracket 112, and a capstan 114. Gear box 108 may comprise a drive shaft 116. Capstan 114 may comprise a hook pin 118. Front portion 106 may comprise a pivot frame 120, a tube 122, an arm 124, a first side plate 126, a second side plate 128, a roller 130, and a flip out support 132. Pivot frame 120 may comprise a locking mechanism 134. First side plate 126 may comprise a first side plate notch 134 and second side plate 128 may comprise a second side plate notch 136.

Gear box 108 may contain a geared mechanism that may transfer the rotational motion of drive shaft 116 to capstan 114 thus causing a corresponding rotation of capstan 114. Capstan 114 may be detached from middle portion 102 by way of a quick release fastener using, for example, a spring loaded ball bearing. Gear box 108 may further include a treaded bore in the bottom of gear box 108. A treaded conduit may be treaded into the treaded bore to support the weight of wire puller 100.

First side plate 126 and second side plate 128 may attach to opposing sides of the end of arm 124. Roller 130 may roll freely between first side plate 126 and second side plate 128. First side plate 126 and second side plate 128 may comprise a thickness that may prevent the bending of first side plate 126 and second side plate 128 during the use of wire puller 100.

Figure 1A:
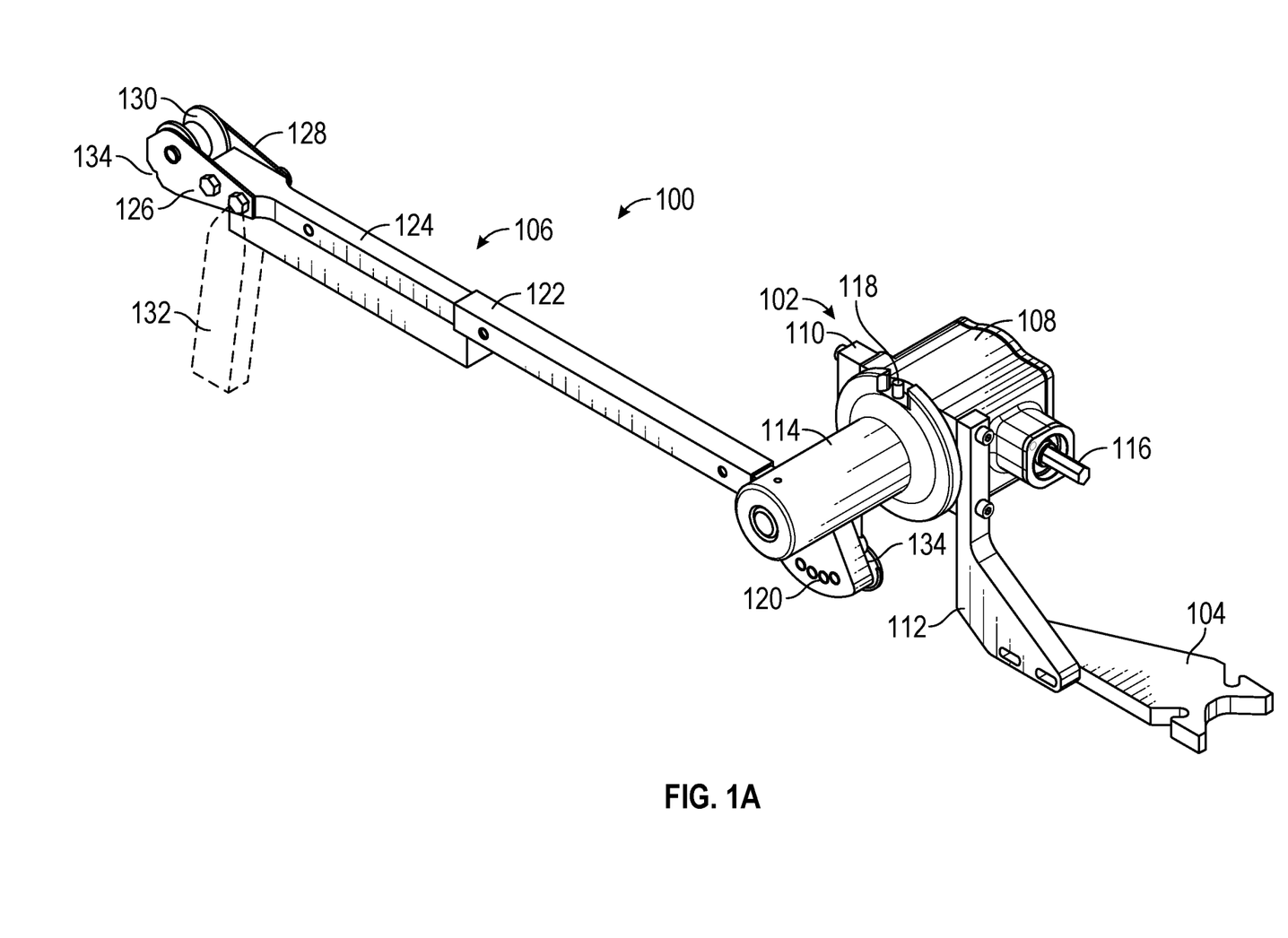
FIG. 1A, FIG. 1B, FIG. 1C, and FIG. 1D show a wire puller.
Figure 1B:
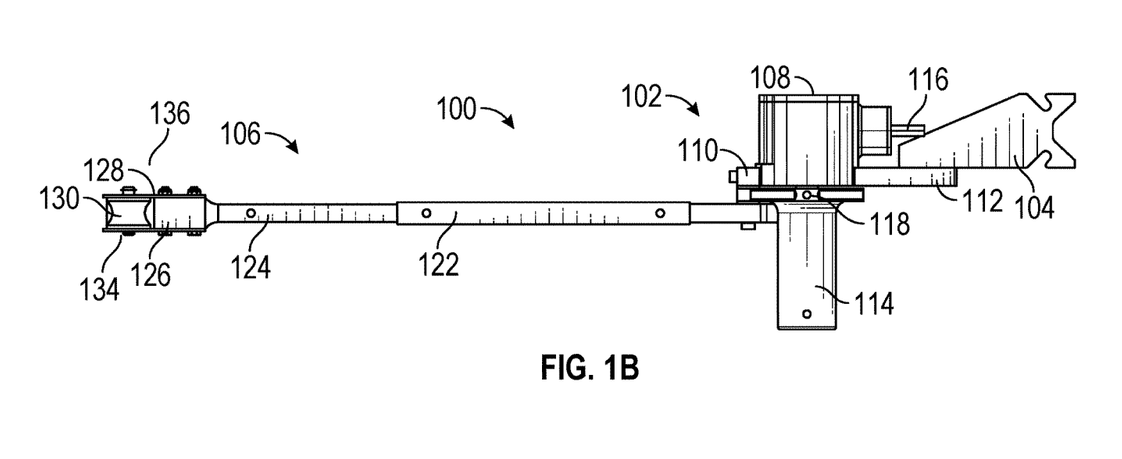
Figures 1C, 1D:
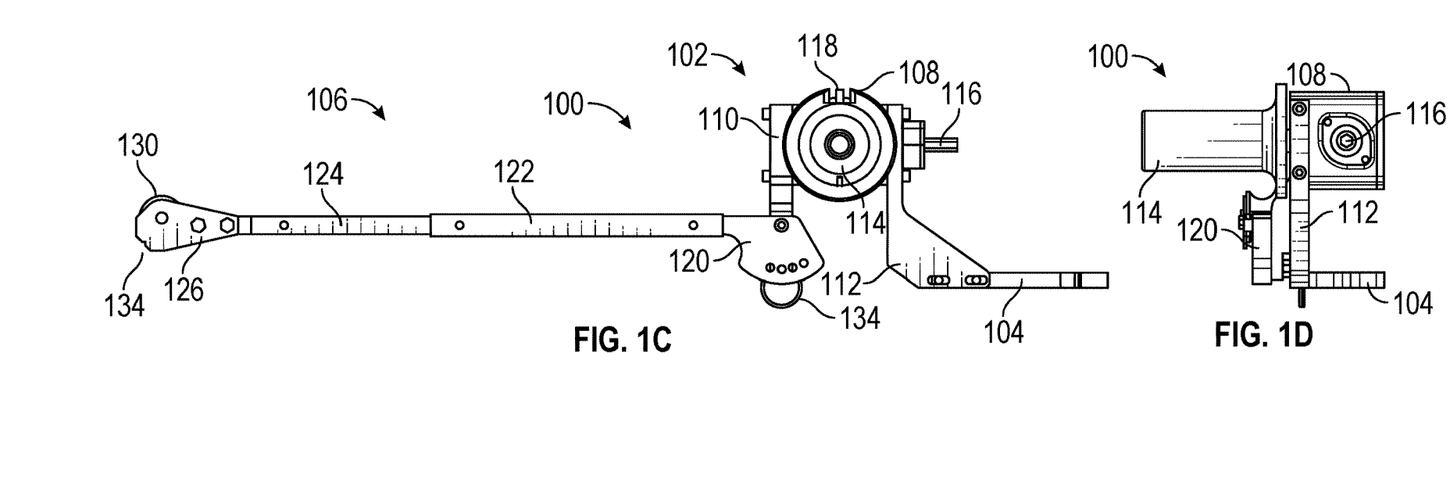
Figure 2:
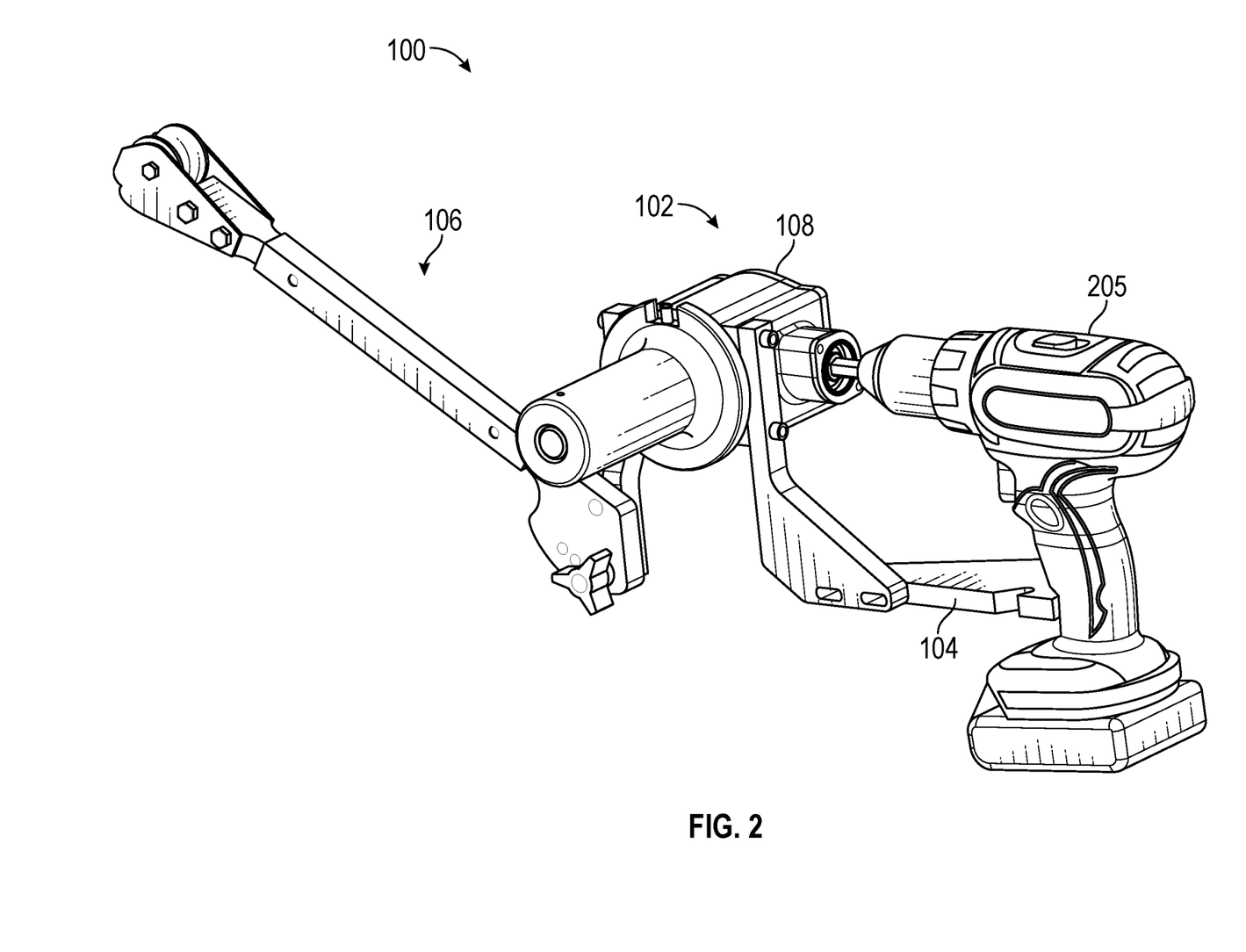
FIG. 2 shows a wire puller with an electric drill attached.

Locking mechanism 134 may be unlocked to allow pivot frame 120 to pivot causing an angle of front portion 106 to be adjusted. This pivoting feature may improve ergonomics when wire puller 100 is used at various angles. A length of front portion 106 may be adjusted by unlocking arm 124 from tube 122 and telescoping arm 124 in or out of tube 122 to obtain a desired length for front portion 106. Flip out support 132 may be extended from a position parallel to arm 124 to any angle with support arm 124 and used to support front portion 106. FIG. 2 shows wire puller 100 with electric drill 205 attached. First side plate notch 134 and second side plate notch 136 may allow operator to rest or lock in arm 124 against an edge of the conduit or the open junction box.

Figure 3:
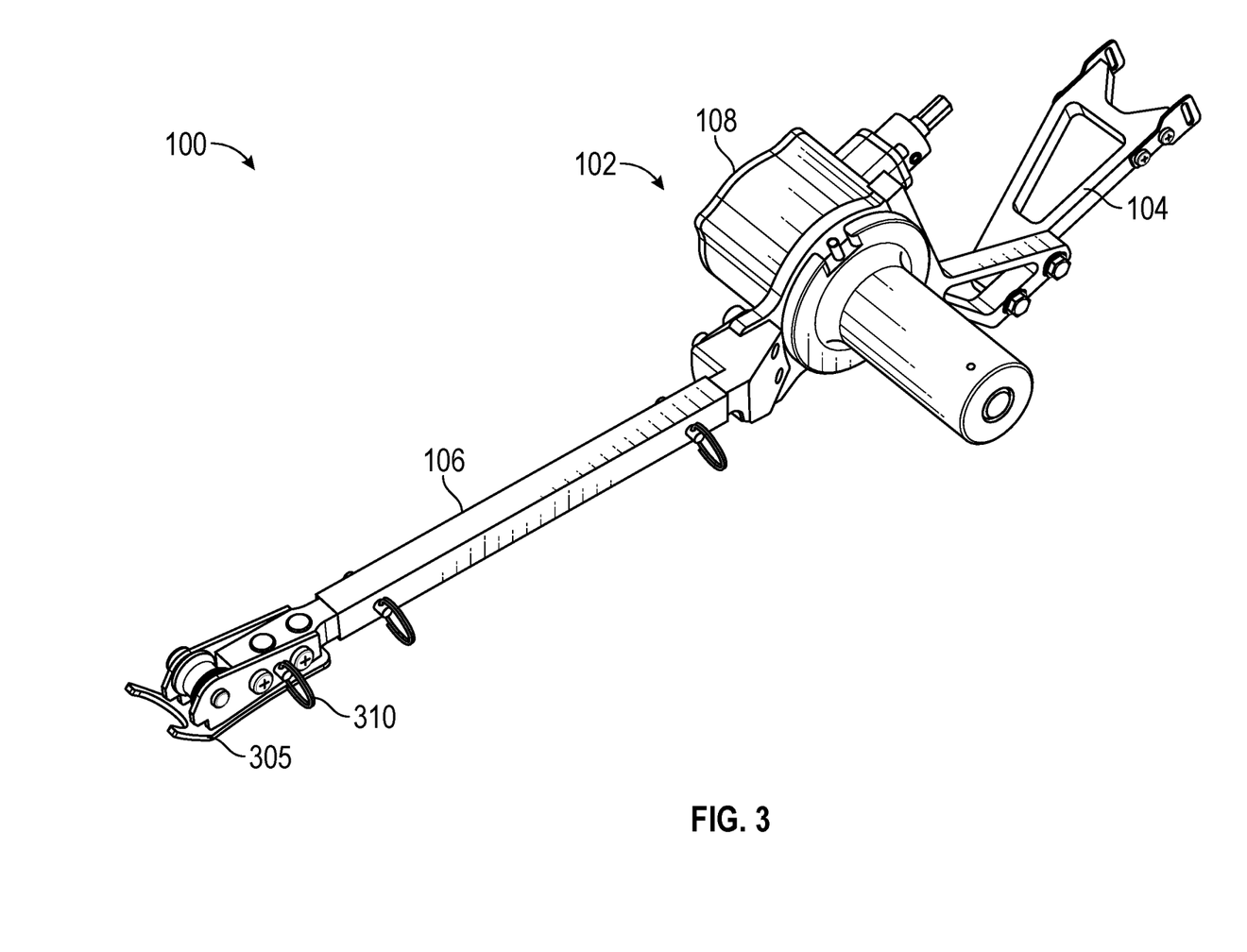
FIG. 3 shows other embodiments of the wire puller.
Figure 4:
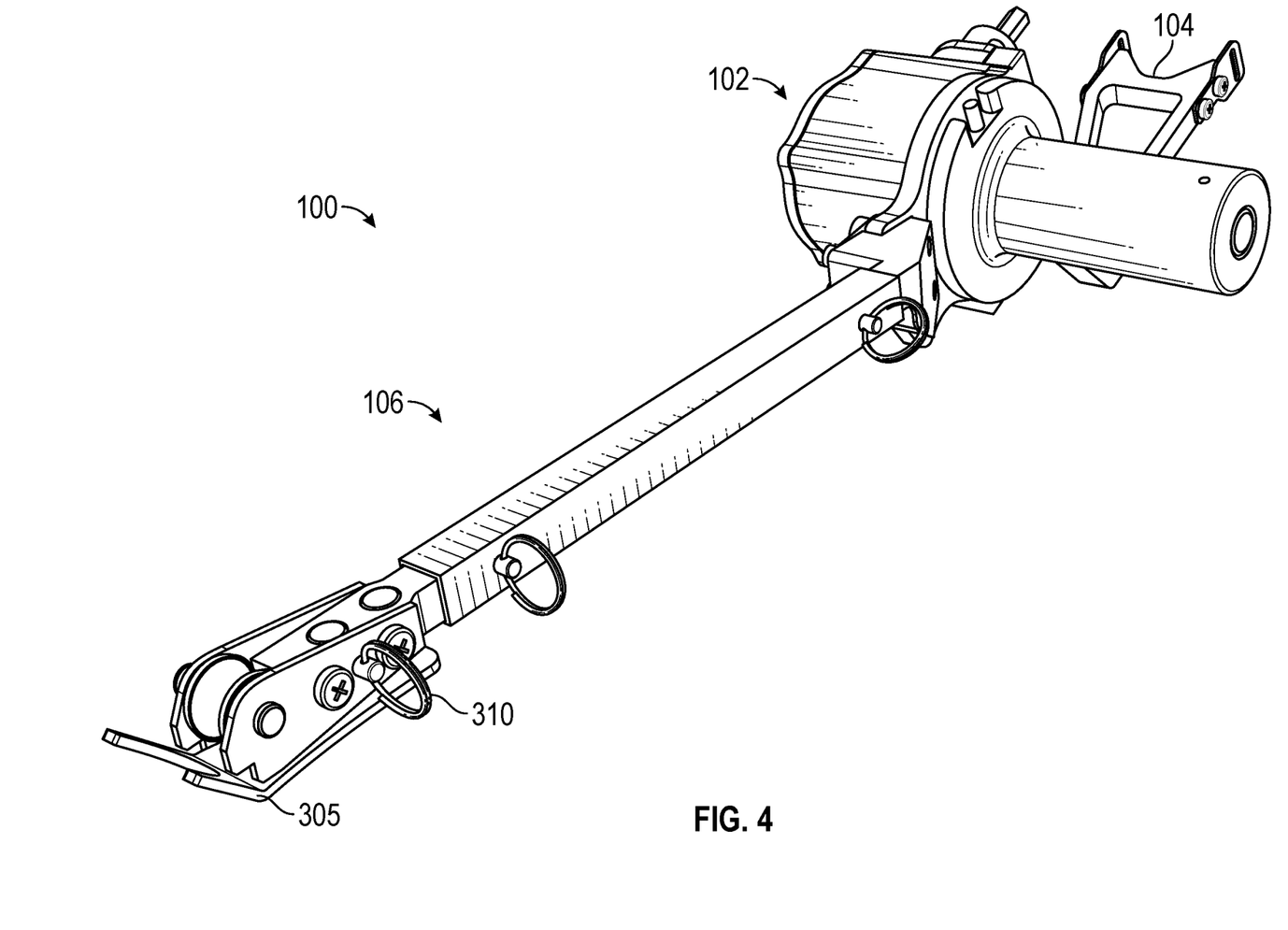
FIG. 4 shows other embodiments of the wire puller.
Figure 5:
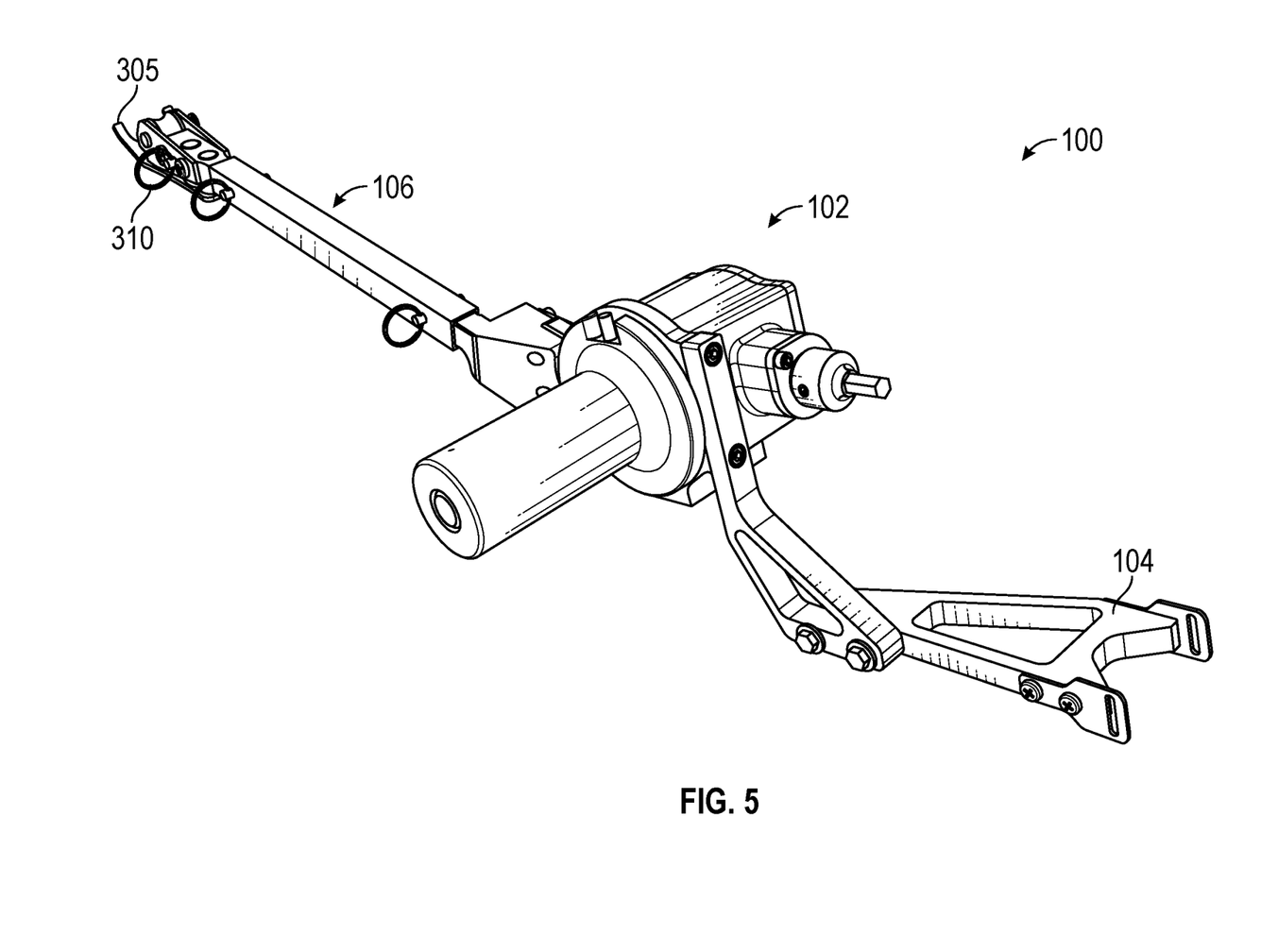
FIG. 5 shows other embodiments of the wire puller.
Figure 6A:
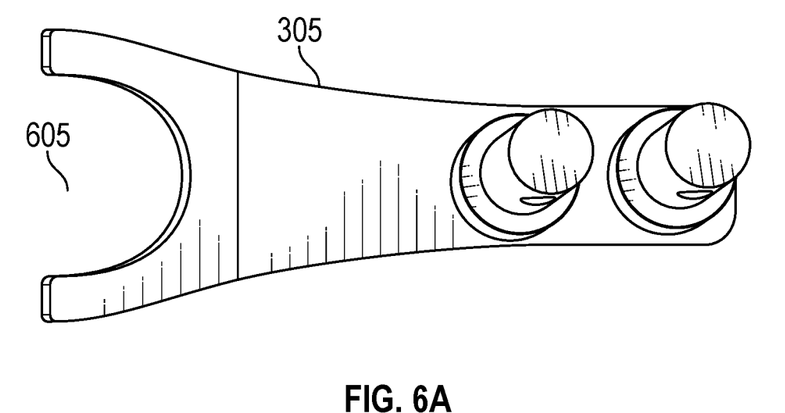
FIG. 6A and FIG. 6B show conduit adaptor.
Figure 6B:
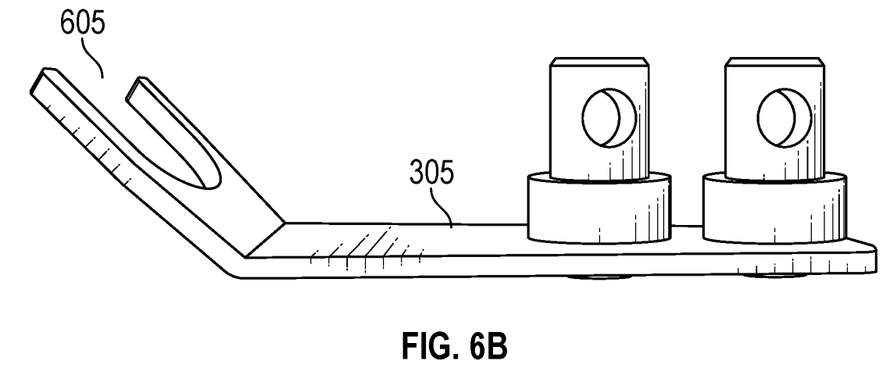
Figure 6C:
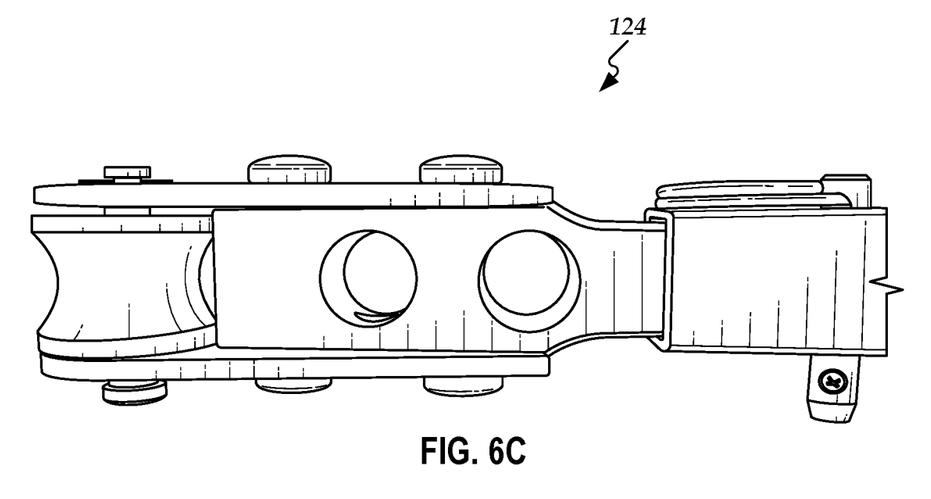
FIG. 6C shows an arm with a conduit adaptor removed.

FIG. 3, FIG. 4, and FIG. 5 illustrate other views and embodiments of wire puller 100. As shown in FIG. 3, FIG. 4, and FIG. 5, front portion 106 may include a conduit adaptor 305 and conduit adaptor locking mechanism 310. FIG. 6A and FIG. 6B show conduit adaptor 305 in more detail. When conduit adaptor locking mechanism 310 is removed from arm 124, conduit adaptor 305 may be feely removed from arm 124. FIG. 6C shows arm 124 with conduit adaptor 305 and conduit adaptor locking mechanism 310 removed. Removable conduit adaptor 305 may be used to anchor or lock wire puller 100 around the conduit. For example, adaptor opening 605 may be placed around the conduit to engage and hold wire puller 100 to the conduit.

Consistent with embodiments of the disclosure, wire puller 100 may be used to pull a wire through a conduit. Prior to pulling the wire, a lightweight flexible line may first be threaded through the entire length of the conduit. This threading may be accomplished, for example, by providing positive air pressure a one end of the conduit and thus blowing the lightweight flexible line from one end of the conduit to the other end of the conduit.

Once the lightweight flexible line has been threaded through the entire length of the conduit, front end 106 of wire puller 100 may be place proximate to an open junction box where one end of the conduit is terminated. Prior to placing wire puller 100 proximate to the open junction box, adjustments may be made to wire puller 100 to make the wire pulling process easier and more ergonomically functional for the operator during the wire pulling process. For example, a length of front portion 106 may be adjusted by telescoping arm 124 in or out of tube 122 to obtain a desired length for front portion 106. In addition, flip out support 132 may be extended from a position parallel to arm 124 to any angle with support arm 124. Moreover, locking mechanism 134 may be unlocked to allow pivot frame 120 to pivot causing an angle of front portion 106 to be adjusted. Once front portion 106 is at a desired angle, locking mechanism 134 may be locked causing front portion 106 to remain stationary at the desired angle.

As shown in FIG. 2, in preparation of pulling the wire, an electric drill 205 may be attached to wire puller 100. For example, electric drill 205's handle may be rested against restraint frame 104 and its chuck may be placed around drive shaft 116. Once electric drill 205's chuck is placed around drive shaft 116, the chuck may be firmly tightened. Accordingly, electric drill 205 may be attached to wire puller 100.

Once the lightweight flexible line has been threaded through the entire length of the conduit, the aforementioned adjustments have been made to wire puller 100, and electric drill 205 has been attached, wire puller 100 may be ready to pull the wire through the conduit. At an opposite end of the conduit, the lightweight flexible line may be attached to the wire.

At this point, front end 106 of wire puller 100 may be place proximate to the open junction box where one end of the conduit is terminated. The lightweight flexible line from the conduit may be run over roller 130, wrapped around capstan 114, and attached to hook pin 118. A bottom of flip out support 132 may be rested on a bottom of the open junction box providing support for front portion 106. The operator my hold the handle of electric drill 205.

To pull the wire from the opposite end of the conduit to the end of the conduit terminated in the open junction box, the operator my press the power button on electric drill 205. The may cause drive shaft 116 to rotate. Gear box 108 may contain a geared mechanism that may transfer the rotational motion of drive shaft 116 to capstan 114 thus causing a corresponding rotation of capstan 114. As capstan 114 rotates, the lightweight flexible line may wrap around capstan 114 thus pulling the lightweight flexible line through the conduit. Because the lightweight flexible line may be attached to the wire, the wire may be pulled through the conduit along with the lightweight flexible line. Once the wire reaches the end of the conduit terminated in the open junction box, the operator may release the power button on electric drill 205. Accordingly, the pulling of the wire trough the conduit may be accomplished by wire puller 100. Capstan 114 may be detached from middle portion 102 with the lightweight flexible line still wrapped around it. Another capstan 114 (without a lightweight flexible line wrapped around it) may be attached to middle portion 102 and wire puller 100 may be quickly ready to pull another wire.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. An apparatus comprising:
a middle portion wherein the middle portion comprises a gear box, a front bracket, a back bracket, and a capstan, wherein the gear box comprises a drive shaft and the capstan comprises a hook pin;
a restraint frame attached to the back bracket; and
a front portion attached to the front bracket, the front portion comprising a pivot frame, a tube, an arm, a first side plate, a second side plate, and a roller, wherein the pivot frame comprises a locking mechanism.

2. The apparatus of claim 1, wherein the first side plate comprises a first side plate notch and the second side plate comprises a second side plate notch.

3. The apparatus of claim 1, further comprising a removable adaptor.

4. The apparatus of claim 3, wherein the removable adaptor comprises a conduit adaptor.

5. The apparatus of claim 1, wherein the capstan is detachable.

6. The apparatus of claim 1, further comprising a support.

7. The apparatus of claim 6, wherein the support comprises a flip out support.

8. The apparatus of claim 1, wherein the gear box further comprises a threaded bore.

9. The apparatus of claim 8, wherein the threaded bore in the bottom of the gear box.

10. The apparatus of claim 9, further comprising a threaded conduit threaded into the threaded bore.

11. An apparatus comprising:
a middle portion wherein the middle portion comprises a gear box, a front bracket, a back bracket, and a capstan, wherein the gear box comprises a drive shaft and the capstan comprises a hook pin;
a restraint frame attached to the back bracket; and
a front portion attached to the front bracket, the front portion comprising a pivot frame, a tube, a first side plate, a second side plate, a support, and a roller, wherein the pivot frame comprises a locking mechanism.

12. The apparatus of claim 11, wherein the first side plate comprises a first side plate notch and the second side plate comprises a second side plate notch.

13. The apparatus of claim 11, further comprising a removable adaptor.

14. The apparatus of claim 13, wherein the removable adaptor comprises a conduit adaptor.

15. The apparatus of claim 11, wherein the capstan is detachable.

16. The apparatus of claim 11, wherein the support comprises a flip out support.

17. The apparatus of claim 11, wherein the gear box further comprises a threaded bore.

18. The apparatus of claim 17, wherein the threaded bore in the bottom of the gear box.

19. The apparatus of claim 18, further comprising a threaded conduit threaded into the threaded bore.

20. An apparatus comprising:
a middle portion wherein the middle portion comprises a gear box, a front bracket, a back bracket, and a capstan, wherein the gear box comprises a drive shaft and the capstan comprises a hook pin wherein the gear box comprises a treaded bore in the bottom of the gear box;
a restraint frame attached to the back bracket; and
a front portion attached to the front bracket, the front portion comprising a pivot frame, a tube, an arm, a first side plate, a second side plate, and a roller, wherein the pivot frame comprises a locking mechanism.

* * * * *